United States Patent
Schierling

(10) Patent No.: US 7,489,124 B2
(45) Date of Patent: Feb. 10, 2009

(54) PROCESS FOR DETERMINING THE LOADING CONDITION OF A DIODE RECTIFIER OF A FREQUENCY CONVERTER

(75) Inventor: Hubert Schierling, Erlangen (DE)

(73) Assignee: Siemens Aktiengesellschaft, München (DE)

(*) Notice: Subject to any disclaimer, the term of this patent is extended or adjusted under 35 U.S.C. 154(b) by 232 days.

(21) Appl. No.: 11/570,851

(22) PCT Filed: Jun. 21, 2005

(86) PCT No.: PCT/EP2005/052898

§ 371 (c)(1),
(2), (4) Date: Dec. 18, 2006

(87) PCT Pub. No.: WO2006/000559

PCT Pub. Date: Jan. 5, 2006

(65) Prior Publication Data

US 2007/0242491 A1  Oct. 18, 2007

(30) Foreign Application Priority Data

Jun. 24, 2004  (DE) .................. 10 2004 030 532

(51) Int. Cl.
*H02M 5/44* (2006.01)
(52) U.S. Cl. .................................................. 324/158.1
(58) Field of Classification Search .................. None
See application file for complete search history.

(56) References Cited

U.S. PATENT DOCUMENTS 6,275,393 B1  8/2001  Baudelot et al.

6,690,592 B2 * 2/2004 Link ........................... 363/98

FOREIGN PATENT DOCUMENTS

| DE | 197 54 126 A1 | 6/1999 |
| EP | 0 948 123 A1 | 10/1999 |
| JP | 05 137 244 A | 6/1993 |

OTHER PUBLICATIONS

"Mehr Qualität für ihr Netz: dank ewz und Siemens", Firmenzeitschrift ewz und Siemens, anlässlich einer Tagung am 4-6 Mai 2004 erstellt.
Netzqualitätsregistrierer SIMEAS Q, Siemens-Produktkatalog SR 10.2.5, Ausgabe 2003.
Auszug aus der Siemens-Firmenschrift "Sicaro PQ Software zur Diagnose der Netzqualität", Ausgabe 01.02.00, S. 1-1 sowie 5. 4-41 bis 4-44.

* cited by examiner

*Primary Examiner*—Paresh Patel
(74) *Attorney, Agent, or Firm*—Henry M. Feiereisen; Ursula B. Day

(57) ABSTRACT

A process is disclosed for determining the charging state of a diode rectifier (4) of a frequency converter (2) connected to a supply grid (18). According to the invention, a rectifier current ($i_{ZKnetz}$) is determined on the basis of a measured intermediate circuit voltage ($U_{ZK}$) and of measured motor currents ($i_1$, $i_2$, $i_3$), and the rectifier current ($i_{ZKnetz}$) is compared with a predetermined threshold value, any upper deviations are stored and the frequency of the deviations within a predetermined time period, which represents a measure of the charging state, is determined. This permits a frequency converter (2), which is connected to a supply grid (18) and has a diode converter (4) on the side of the grid, to determine without difficulty the charging state of its diode rectifier (4) after temporary grid voltage breakdowns, so that the diodes of the diode rectifier (4) need no longer be oversized.

6 Claims, 1 Drawing Sheet

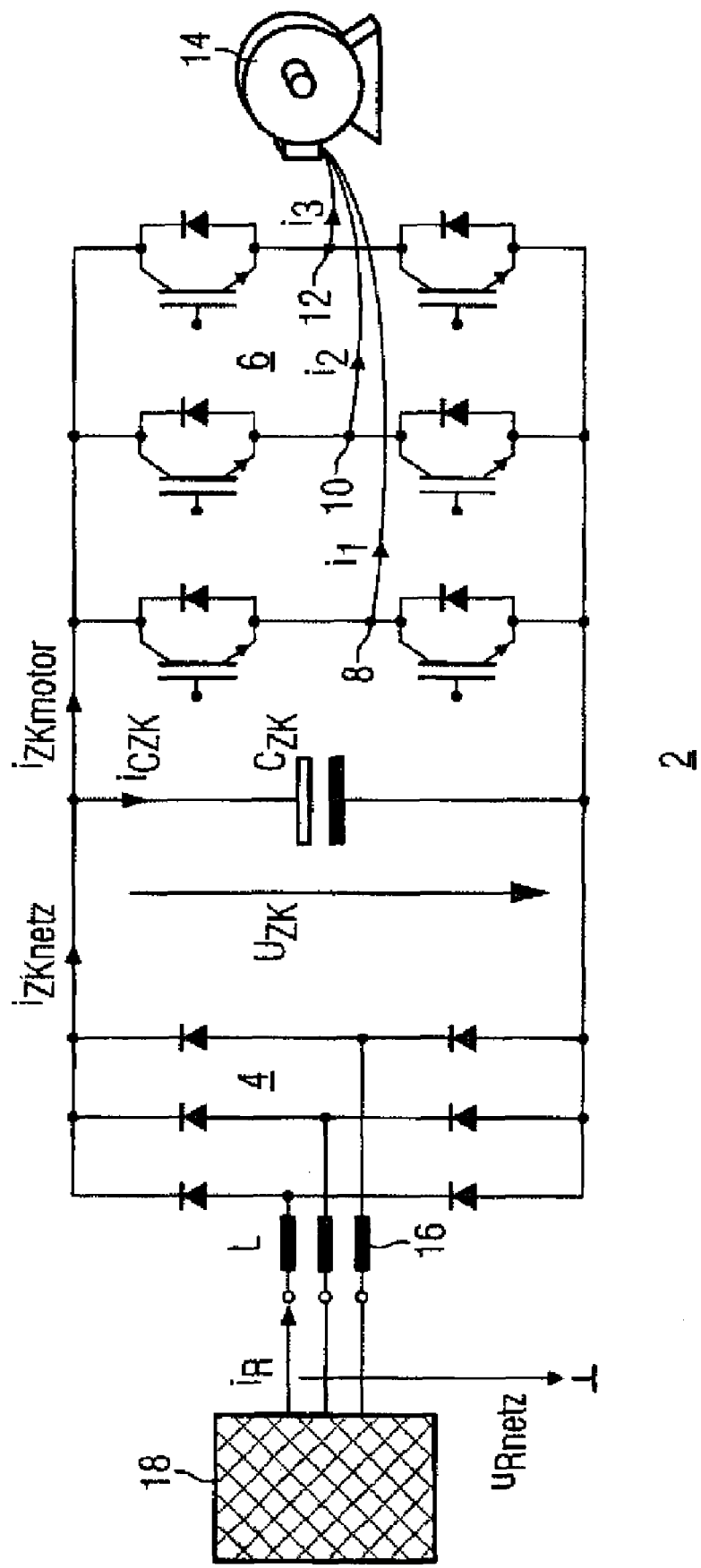

PROCESS FOR DETERMINING THE LOADING CONDITION OF A DIODE RECTIFIER OF A FREQUENCY CONVERTER

BACKGROUND OF THE INVENTION

The invention relates to a process for determining the loading condition of a diode rectifier of a frequency converter connected to a mains supply.

In frequency converters, in particular in those where diode rectifiers are used to supply a DC link circuit, faults in the mains supply result in increased loading of the diode rectifier, which can be destroyed by an overload.

In particular, dips in the voltage from the mains supply with subsequent rapid restoration of the dipped mains voltage cause significant loading of the diodes of the diode rectifier of the frequency converter connected to the mains supply. The rapid restoration of the mains voltage means that the DC link circuit of the frequency converter connected to the mains supply is recharged by a very high charging current. Since a charging circuit for the DC link circuit provided in the frequency converter is not enabled for momentary mains voltage dips (<20 msec), the magnitude of the charging current after restoration of supply is set solely by the voltage difference between mains voltage and DC link voltage, and the rate at which the voltage is restored. The diodes of the rectifier must conduct this excessive charging current following restoration of supply. If there is a succession of such momentary mains voltage dips, then the diodes of the diode rectifier of the frequency converter connected to the mains supply are thermally damaged, causing the frequency converter to fail.

Such a problem is more common in mains supplies that are not very stable. Until now, this problem has been solved by oversizing the diode rectifiers of a frequency converter, i.e. the rectifier is designed to be large enough to withstand such a fault using a surge-current threshold value or maximum load integral. In addition, reactors having large inductance values are used on the line side. Line reactors are also required if mains pollution from the frequency converter is to be minimized This means that if these existing line reactors are also to be used to help solve the problem mentioned, their inductance values must be increased accordingly. If frequency converters are manufactured for specific countries, then no measures need to be taken if these frequency converters are only operated on very stable mains systems. Market globalization means that it is not economically viable if one and the same frequency converter is designed differently or is provided with options for different mains systems. It would be very useful for someone purchasing a frequency converter if the frequency converter could itself determine the loading condition of its line-side diode rectifier in order to be able to respond selectively, and in good time, to a loading condition that is increasing.

SUMMARY OF THE INVENTION

The object of the invention is to define a process that can be used to determine the loading condition of a diode rectifier of a frequency converter connected to a mains supply.

This object is achieved according to the invention by a process for determining the loading condition of a diode rectifier of a frequency converter connected to a mains supply, where a rectifier current is determined as a function of a measured link-circuit voltage and a measured motor-side link-circuit current or measured motor currents, this rectifier current being compared with a preset threshold value such that instances of excessive current are stored, and where the frequency of occurrence of these instances within a preset time period is determined, which represents a measure of the loading condition.

According to the invention, a rectifier current is determined from measured quantities of a frequency converter that already exist for the purposes of controlling and protecting the frequency converter, and is compared with a preset threshold value. Each instance of excessive current is stored in order to be able to determine the frequency of occurrence of these instances in a preset time period. This determined frequency of occurrence per unit of time is a measure of the loading condition of the diode rectifier. Hence one obtains in a straightforward manner from existing measured quantities of the frequency converter, the loading condition of its line-side rectifier. Knowing this loading condition, countermeasures can be taken selectively.

In an advantageous process, a load integral is calculated for each occurrence of rectifier overload current and compared with a maximum load integral such that if it is exceeded, the frequency converter connected to the mains supply is switched off, thereby reducing the risk of thermal overload of the rectifier.

In a further advantageous process, the determined frequency of occurrence is compared with a preset frequency of occurrence such that if it is exceeded, a warning signal is output. The owner of this frequency converter connected to the mains supply can thereby recognize in good time that the line-side diode rectifier has reached a critical loading condition as a result of a succession of mains voltage dips.

The dependent claims describe how a rectifier current is determined from the existing measured quantities of the frequency converter.

By means of the process according to the invention, which can be retrofitted in any frequency converter having an input-side diode rectifier, the frequency converter connected to any mains supply can establish without major complexity the loading condition of the line-side diode rectifier as a result of momentary mains voltage dips. Countermeasures can be taken in advance once this loading condition is known.

BRIEF DESCRIPTION OF THE DRAWINGS

To explain the invention further, the process according to the invention is described in greater detail with reference to FIG. 1, which shows an equivalent circuit of a conventional frequency converter having a diode input unit connected to a mains supply.

DETAILED DESCRIPTION OF PREFERRED EMBODIMENTS

This FIG. 1 shows an equivalent circuit of a frequency converter 2 comprising a diode rectifier 4 as line-side converter and a self-commutated pulse converter 6 as load-side converter. Both converters are connected together electrically on the DC side by a DC link circuit. This DC link circuit has a link-circuit capacitor $C_{ZK}$ having a voltage drop given by a link-circuit voltage $U_{ZK}$. A motor 14 is connected across the phase outputs 8, 10 and 12 of the self-commutated pulse converter 6. Motor 14 and frequency converter 2 form what is called a drive. On the input side, this frequency converter 2 has a line-side commutation reactor 16, which contains an inductance L for each mains phase. This frequency converter 2 is connected to a mains supply by this line-side commutation reactor 16.

The diode rectifier 4 generates from the applied phase voltages $U_{Rnetz}$, $U_{Snetz}$, and $U_{Tnetz}$ of the mains supply 18 a rectified voltage, the link-circuit voltage $U_{ZK}$, which is buffered by the link-circuit capacitor $C_{ZK}$. In addition, this diode rectifier 4 supplies a rectifier current $i_{ZKnetz}$, which is composed of the phase currents $i_R$, $i_S$ and $i_T$ of the mains supply 18. This rectifier current $i_{ZKnetz}$, which is also referred to as a line-side link-circuit, is split into a charging current $i_{CZK}$ of the link-circuit capacitor $C_{ZK}$ and a load-side link-circuit current $i_{ZKmotor}$. For reasons of clarity, only those voltages and currents in phase R are shown of the phase voltages $U_{Rnetz}$, $U_{Snetz}$ and $U_{Tnetz}$ and the phase currents $i_R$, $i_S$ and $i_T$.

Since the value of the link-circuit voltage $U_{ZK}$ depends directly on the amplitude of the mains voltage, a voltage dip can be detected immediately in the link-circuit voltage $U_{ZK}$. If the link-circuit voltage $U_{ZK}$ drops below a lower set value, the frequency converter 2 switches off. If after a voltage dip, the mains voltage rises back to its original value, then an increased line-side link-circuit current $i_{ZKnetz}$ flows. The faster the rate of voltage rise, the greater the line-side link-circuit current $i_{ZKnetz}$. If this rectifier current $i_{ZKnetz}$ exceeds a preset threshold value, the diodes of the diode rectifier 4 are loaded to a greater extent. If there is a succession of such momentary dips in mains voltage (<20 msec), the loading condition of the diode rectifier 4 increases. Each instance of excessive rectifier current $i_{ZKnetz}$ is stored, so that its frequency of occurrence can be determined for a preset time period. The value of this determined frequency of occurrence per time period reflects the loading condition of the diode rectifier 4. Thus the value of the determined frequency of occurrence represents a measure of the loading condition of the diode rectifier 4 of a frequency converter 2 connected to a mains supply 18.

The link-circuit voltage $U_{ZK}$ and the motor-side link-circuit current $i_{ZKmotor}$ or the motor currents $i_1$, $i_2$ and $i_3$ are measured for control and protection purposes. Using equations, one obtains the line-side link-circuit current $i_{ZKnetz}$ without further measured quantities. Where the motor current is measured, the motor power is calculated from the equation below using the measured motor currents $i_1$, $i_2$ and $i_3$ and the output voltages of the self-commutated pulse converter 6:

$$P_{motor}=u_1 \cdot i_1+u_2 \cdot i_2+u_3 \cdot i_3 \tag{1}$$

These output voltages $u_1$, $u_2$ and $u_3$ of the frequency converter 2 do not need to be measured, because the control device of the frequency converter 2 provides the setpoint values of these output voltages. The equation below gives the value of the motor-side link-circuit current $i_{ZKmotor}$ as a function of this calculated motor power $P_{motor}$ and the measured link-circuit voltage $U_{ZK}$:

$$i_{ZKmotor}=P_{motor}/U_{ZK} \tag{2}$$

The line-side link-circuit current $i_{ZKnetz}$ is obtained from Kirchhoff's current law as:

$$i_{ZKnetz}=i_{CZK}+i_{ZKmotor} \tag{3}$$

where the loading current $i_{CZK}$ is calculated from the following equation:

$$i_{CZK}=C_{ZK} \cdot dU_{ZK}/dt \tag{4}$$

Thus by a few simple computational operations, one obtains from existing measured quantities the rectifier current $i_{ZKnetz}$, which can be evaluated regarding the loading condition of the diode rectifier 4. The existing measured quantities $U_{ZK}$ and $i_1$, $i_2$ and $i_3$, and $u_1$, $u_2$ and $u_3$ are available for every sampling step throughout operation.

This calculated rectifier current $i_{ZKnetz}$ is compared continuously with a preset threshold value in order to be able to establish whether there is an overload current flowing in the diode rectifier 4. Each occurrence of an overload current is stored in order to be able to establish the frequency of occurrence in a preset time period. The higher the value of this frequency of occurrence, the higher the loading condition of the diode rectifier 4 of the frequency converter 2 connected to the mains supply 18.

In addition, a load integral A can be calculated as a function of the determined rectifier current $i_{ZKnetz}$ using the equation:

$$A=\int (i_{ZKnetz})^2 \cdot dt$$

These calculated load integrals A are continuously compared with a preset maximum load integral $A_{Gr}$. If this maximum load integral $A_{Gr}$ is exceeded, the frequency converter is switched off. Switching off reduces the overload current depending on the instantaneous motor power. Reducing the current at the motor side helps to build up the link-circuit voltage. Switching off prevents a further operation that might destroy the device and makes operating staff aware of the mains fault that has occurred.

The increase in the value of the frequency occurrence and hence the increase in the loading condition of the diode rectifier 4 of the frequency converter 2 can be visualized by light emitting diodes, where the value of the frequency occurrence is graded per time period. This grading can also be visualized by colored light emitting diodes (green, yellow, red). If a preset threshold loading condition is reached, the frequency converter is switched off so that this device is not destroyed.

A junction temperature of a diode of the diode rectifier 4 is calculated using the power loss calculated from the rectifier current $i_{ZKnetz}$ and a known diode conducting-state characteristic, and a thermal semiconductor model known per se. The frequency converter is switched off on a threshold value being reached. To improve accuracy, the rectifier current $i_{ZKnetz}$ can be assigned selectively to specific diodes of the diode rectifier 4, for example by using the mains frequency of the mains supply. This means that the thermal model can be calculated separately for each diode.

In order to eliminate currents through any pulse resistor that may be present, negative values of the line-side link-circuit current $i_{ZKnetz}$ are suppressed, or the measurement is suspended for link-circuit voltages $U_{ZK}$ that lie above the threshold voltage of the pulse resistor.

By means of this process according to the invention, a frequency converter 2 connected to a mains supply 18 is now capable of determining the loading condition of its line-side diode rectifier 4, even without great complexity, thereby preventing thermal destruction of the diode rectifier 4 as a result of a succession of mains voltage dips in a short period. This means that failure of the frequency converter, with the associated disadvantages such as costs and loss of image, occurs less frequently, without the need to oversize the diode rectifier 4 of the frequency converter 2.

What is claimed is:

1. A method for determining a loading condition of a diode rectifier of a frequency converter connected to a mains power supply, comprising the steps of:
    determining a rectifier current as a function of a measured link-circuit voltage and a measured motor-side link-circuit current or measured motor currents,
    comparing the rectifier current with a preset threshold value,
    recording overshoots of the rectifier current above the preset threshold value, and
    determining a frequency with which the overshoots occur within a preset time period, said determined frequency representing a measure of the loading condition.

2. The method of claim 1, further comprising calculating a load integral for each occurrence of overload current, comparing the calculated load integral with a preset maximum load integral, and switching the frequency converter off if the calculated load integral exceeds the preset maximum load integral.

3. The method of claim 1, further comprising comparing the determined frequency of occurrence with a preset frequency of occurrence, and outputting a warning signal if the determined frequency of occurrence exceeds the preset frequency of occurrence.

4. The method of claim 1, wherein the rectifier current is calculated as a function of a measured link-circuit voltage and a measured motor-side link-circuit current using the following equation:

$$i_{ZKmains} = C_{ZK} \cdot dU_{ZK}/dt + i_{ZKmotor}$$

wherein
$i_{ZKmains}$ is the mains-side link-circuit current,
$i_{ZKmotor}$ is the motor-side line-circuit current,
$C_{zk}$ is the link-circuit capacitance, and
$dU_{ZK}/dt$ is the rate of change of the link-circuit voltage.

5. The method of claim 4, wherein the motor-side link-circuit current is determined as a function of the measured link-circuit voltage and a calculated motor power using the following equation:

$$i_{ZKmotor} = P_{motor}/U_{ZK}$$

wherein
$i_{ZKmotor}$ is the motor-side link-circuit current,
$U_{ZK}$ is the link-circuit voltage, and
$P_{motor}$ is the determined motor power.

6. The method of claim 5, wherein the motor power is calculated from measured motor currents and preset motor voltages using the following equation:

$$P_{motor} = u_1 \cdot i_1 + u_2 \cdot i_2 + u_3 \cdot i_3$$

wherein
$u_1$, $u_2$, and $u_3$ are the oreset motor voltages,
$i_1$, $i_2$, and $i_3$ are the measured motor currents, and
$P_{motor}$ is the calculated motor power.

* * * * *